(12) United States Patent  
Yoshikawa (10) Patent No.: US 7,264,406 B1
(45) Date of Patent: Sep. 4, 2007

(54) RELEASING MECHANISM OF PLUGGABLE TRANSCEIVER FROM CAGE

(75) Inventor: Satoshi Yoshikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/372,230

(22) Filed: Mar. 10, 2006

(51) Int. Cl.
*G02B 6/36* (2006.01)

(52) U.S. Cl. .......................................... 385/88; 385/92
(58) Field of Classification Search .................. 385/92
See application file for complete search history.

(56) References Cited

U.S. PATENT DOCUMENTS

| | | | |
|---|---|---|---|
| 6,439,918 B1* | 8/2002 | Togami et al. | 439/372 |
| 7,033,204 B1* | 4/2006 | Wang | 439/372 |
| 7,040,911 B1* | 5/2006 | Ho et al. | 439/352 |
| 7,118,281 B2* | 10/2006 | Chiu et al. | 385/53 |
| 2003/0142917 A1* | 7/2003 | Merrick | 385/53 |

OTHER PUBLICATIONS

Co-pending U.S. Appl. No. 11/117,695, filed Apr. 29, 2005.

* cited by examiner

*Primary Examiner*—Michelle Connelly-Cushwa
*Assistant Examiner*—Chris Chu
(74) *Attorney, Agent, or Firm*—Smith, Gambrell & Russell, LLP (57) ABSTRACT

The optical transceiver configured with a pluggable function according to the present invention provides new releasing mechanism of the transceiver from the cage. The transceiver comprises an optical receptacle, an actuator with a latching projection, a bail assembled with the receptacle such that, by rotating the bail as sandwiching the receptacle by the legs thereof, the latching projection may be released from the cage. The end of the bail comes in contact to the actuator to make a seesaw motion for the actuator to draw the latching projection to disengage with the cage.

16 Claims, 7 Drawing Sheets

RELEASING MECHANISM OF PLUGGABLE TRANSCEIVER FROM CAGE

RELATED APPLICATION

This application is related to co-pending application Ser. No. 11/117,695, filed Apr. 29, 2005, entitled "Releasing mechanism of pluggable transceiver", and assigned to the Assignee of the present application.

BACKGROUND OF THE INVENTION

1. Field of the Invention

The present invention relates to a mechanism of an optical pluggable transceiver for latching with/releasing from a cage.

2. Related Prior Art

The so-called pluggable transceiver is inserted into the cage of the host system. The cage is a metal box with one end thereof opening for the outside. This cage is installed on the host system such that an electrical connector on the host system is set in the deep end of the cage, and the opened end is exposed in the face panel of the host system. Thus, the pluggable transceiver is inserted into the cage from the face panel and an electrical plug provided in the rear end of the transceiver is mated with the electrical connector in the deep end of the cage.

In particular, the transceiver capable of inserting into or extracting from the cage without shutting down the host system is called as a hot pluggable transceiver. The pluggable transceiver is necessary to provide a mechanism for latching with the cage. It is necessary for the mechanism that, when the optical connector mates with the receptacle of the transceiver, the transceiver can not be released from the cage, and can be released therefrom only when the receptacle is free from the connector. Various latching mechanisms have been proposed and disclosed in prior arts.

The United States patent, U.S. Pat. No. 6,439,918, has disclosed a latching mechanism, in which a combination of a bail with a shape of a wire frame and a pivot block causes a rock pin provided in the end of the block up-and-down motion to disengage the pin with the cage. The bail comprises a grip portion to be handled, a shoulder portion buried in the block, and a body portion connecting the grip portion to the shoulder portion, these portions configuring the wire frame.

A center of the shoulder portion forms a cam by bending the wire inward, and the shoulder portion including the cam is buried within the block. The block makes the seesaw motion around the pivot arm. That is, to rotate the bail causes the cam to be rotated within the groove to push the receptacle outward by the head of the cam. Thus, the block makes the seesaw motion, so the rock pin provided in the position opposite to the cam portion is pulled within the receptacle to release the engagement between the pin and the cage. This transceiver provides a fin for supporting the block from the bottom, accordingly, the block may not dismantled from the receptacle.

The United States patent application, published as USP A-2003-142917, has disclosed another latching mechanism. This mechanism, although providing the bail and the actuator, the bail only functions as a grip to slide the actuator frontward and rearward. The rotation of the bail is not converted into the longitudinal motion of the actuator or the vertical motion of the latching projection. The tip end of the actuator forms a wedge that is received within the pocket formed in the transceiver body when the transceiver is inserted into and engaged with the cage. The side of the pocket is a slant surface, on which the wedge slides to lift up the latching tab of the cage when the transceiver is pulled out from the cage by handling the bail. Thus, the engagement between the latching projection of the transceiver and the latching tab of the cage may be released. The actuator provides a spring which sets the neutral position of the actuator as the wedge being received within the pocket.

SUMMARY OF THE INVENTION

According to the present invention, an optical transceiver having a new mechanism for engaging/disengaging it with a cage on the host system is provided. The optical transceiver comprises an optical receptacle, a bail and an actuator. The bail and the actuator are assembled with the optical receptacle such that the actuator, with a latching projection provided in one end thereof, makes a seesaw portion to push out and put in the latching projection by rotating the bail. The actuator includes a side block where the bail in an end projection thereof slides thereon as the rotation of the bail. This side block continuously provides a hollow, a flat surface, and an arched surface in this order and in smooth. Synchronizing with the rotation of the bail, the end projection thereof slides on these surfaces to push out the actuator and at the same time to pull the latching projection inward.

According to the present invention, the engagement between the transceiver and the cage may be easily released by a simple mechanism of the bail with the end projection and the actuator with a combination of sliding surfaces.

The sliding surfaces may further include another hollow between the first hollow and the flat surface. By setting the sliding projection of the bail within the other hollow, the bail may be temporarily stable during its rotation, which realizes the so-called double-decker action.

Moreover, the actuator of the present invention provides an elastic bar that presses the receptacle when the actuator is assembled therewith. As a repulsion of this pressure, a portion of the actuator, where the sliding surface is provided, is drew to the receptacle. Accordingly, the force to recover the bail to the initial position may be lighter than the force to rotate the bail from the initial position, which enables to release the transceiver from the cage in ease.

DESCRIPTION OF PREFERRED EMBODIMENTS

Figure 1:
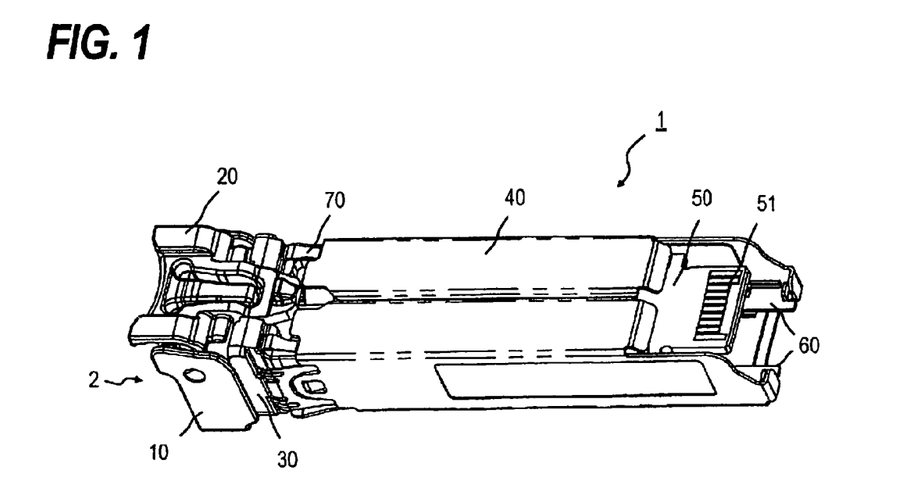
FIG. 1 is a perspective drawing of the optical transceiver according to the present invention viewed from the bottom thereof.

FIG. 1 is a perspective illustration of a pluggable transceiver (hereinafter denoted as "transceiver") viewed from the bottom thereof. The transceiver 1 comprises a bail 10, an actuator 20, a receptacle 30, a cover 40, a substrate 50, and a frame 60. Here, a direction where the receptacle 30 is provided is called as the foreside, while the direction, opposite to the receptacle 30 and provided with an electrical plug 51 on the substrate 50, is called as the rear side for the explanation sake.

The visible side in FIG. 1, i.e., the side where the actuator 20 is assembled is the bottom side of the transceiver 1, while the side opposite thereto, which is hidden in FIG. 1, is called as the topside. These top and bottom sides are in accordance with the direction when the transceiver 1 is inserted into the cage. The rear of the transceiver 1 is inserted into the cage, and the plug 51 formed in the rear end mates with the connector installed within the deep end of the cage. The front side of the receptacle 30 exposes from the opening of the face panel of the host system, and the optical connector is to be inserted into the receptacle.

The transceiver 1 according to the present embodiment provides the actuator 20 and the receptacle 30 formed by resin molding, while two types of bail 10, metallic and resin molded one, are disclosed. Moreover, the cover 40 and the frame 60 have a structure formed by cutting, bending and tapping of single metal plate without welding or gluing. Next, the bail 10, the actuator 20, and the receptacle 30 of the present transceiver 1 will be described in detail.

Actuator

Figure 2A:
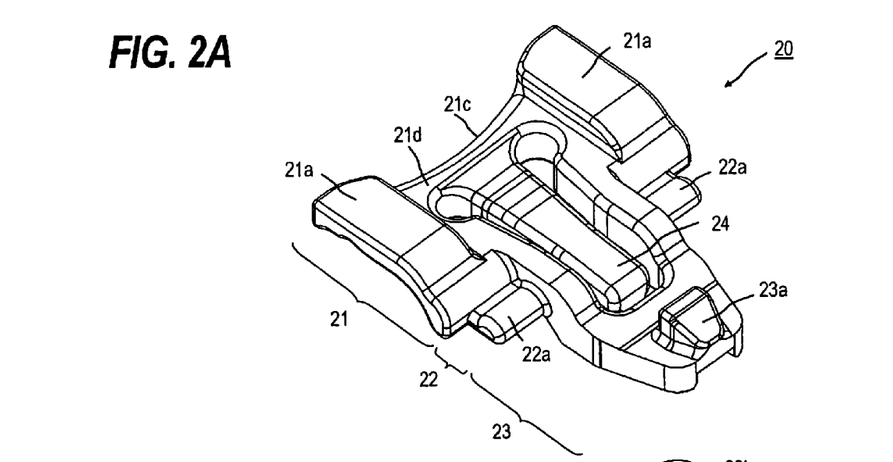
FIGS. 2A and 2B are perspective drawings of the actuator according to the present invention viewed from directions opposite to each other.
Figure 2B:
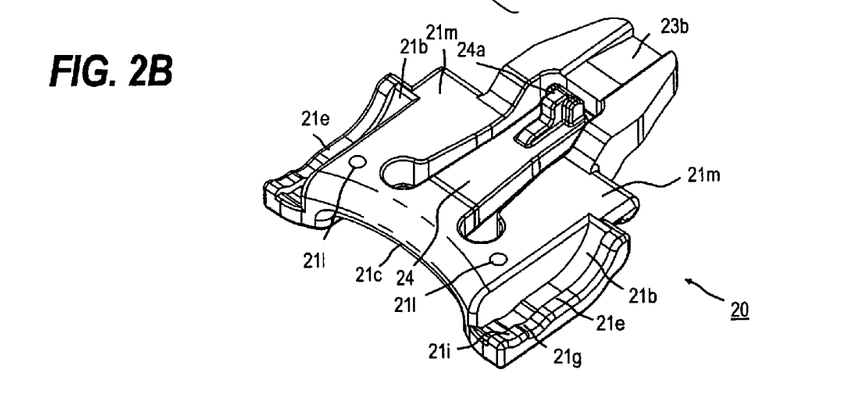
Figure 2C:
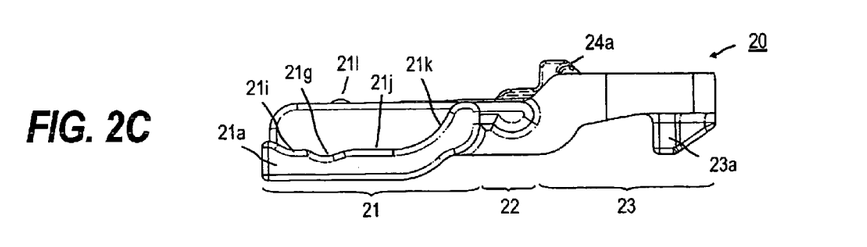
FIG. 2C is a side view of the actuator.

FIG. 2A illustrates the actuator 20 viewed from the bottom thereof, FIG. 2B views from the top, and FIG. 2C is a side view. The actuator 20 roughly comprises a body portion 21, a fulcrum portion 22, and an operating portion 23. The body portion 21 includes side blocks 21a, a beam 21d connecting these side blocks 21a, and an elastic bar 24 extending rearward from the beam 21d. Each side block 21a, in an upper side thereof, provides two sliding surfaces, 21b and 21e, with a step therebetween and forms a plurality of curved surfaces, 21i, 21g, 21j and 21k, connected in smooth to each other. Inner part of this sliding surface is called as a sliding groove 21b, while the outer part thereof is called as a guiding edge 21e.

The sliding groove 21b and the guiding edge 21e forms hollows, 21i and 21g. As described later relating to FIGS. 4A and 4B, the bail 10 is set in the neutral position, the initial position such that the hollow 21i receives a projection 11b, while the bail 10 is in a temporary position for the projection 11b to set in the hollow 21g. Detailed mechanism between this actuator 20 and the bail 10 will be described later.

The front of the beam 21d is slightly curved inward to widen a space to the front end of the receptacle 30, which facilitates to grip the bail 10. The elastic bar 24 is formed with an elevated angle of about 3.5° with respect to the upper surface 21m to raise the tip end portion thereof. This elastic bar 24 is deformed as the actuator 20 is built with the receptacle 30. Repulsive force due to this deformation may be received by the recess 31d of the receptacle 30, which is illustrated in FIG. 3. Since the recess 31d and the end of the elastic bar 24 are formed in offset, this repulsive force makes the front side of the actuator 20 upward. Accordingly, a projection 21l formed in the beam 21d may come in point contact to the bottom of the receptacle 30.

The end of the elastic bar 24 reaches the operating portion 23 passing the fulcrum portion 22, and provides the latching projection 24a in this end portion, which has a T-shaped horizontal section and, as explained later, restricts the movement of the actuator 20 along the longitudinal direction by setting within the pocket 32f formed in the center wall of the receptacle 30. Moreover, the elastic bar 24, by rigidly fixing to the receptacle 30, gives the repulsive force to the receptacle 30, as describe before, even the actuator 20 is forced to move in the seesaw motion by rotating the bail 10, the actuator 20 automatically recovers the position shown in FIGS. 2A and 2B due to the resilience of the elastic bar 24.

The fulcrum portion 22 forms an axial cylinder 22a. This axial cylinder 22a is set within the recess 31d formed in the receptacle 30. Within the recess 31d is processed in cylindrical and, by smoothly rotating the axial cylinder 22a within the recess 31d, the actuator 20 is able to make the seesaw motion.

The end of the operating portion 23 forms a latching projection 23a, a rear side surface of which is slanted, while the front side surface of which has a steep edge, almost vertical against the base of the operating portion 23. As the transceiver 1 is inserted within the cage, the slanted surface lifts up the latching tab of the cage.

The transceiver 1 provides a mechanism that, once the latching projection in the steep edge thereof securely engages with the opening in the latching tab, this engagement is to be unable to be released without the de-latching mechanism like the present invention. Moreover, the top of the operating portion 23 forms a groove 23b that receives the center partition 32d, shown in FIG. 3B, to widen the range of the seesaw motion of the actuator 20 when the operating portion 23 of the actuator 20 is brought close to the receptacle 30.

FIG. 2C is a side view of the actuator 20. The side block 21a continuously forms, from the front thereof, a first hollow 21i, a second hollow 21g, a flat surface 21j and an arched surface 21k. As shown later, by sliding the projection 11b of the bail 10 on these plural surfaces, the rotational motion of the bail 10 may be converted into the seesaw motion of the actuator 20. The arched surface 21k forms an equidistance surface with respect to the center of the rotation of the bail 10.

Receptacle

Figure 3A:
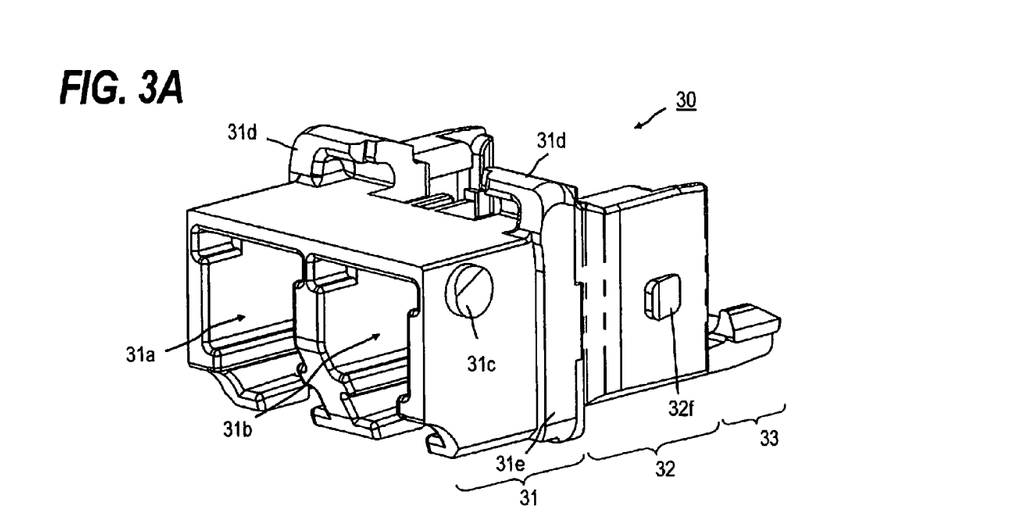
FIGS. 3A and 3B are perspective drawings of the receptacle viewed from different directions.
Figure 3B:
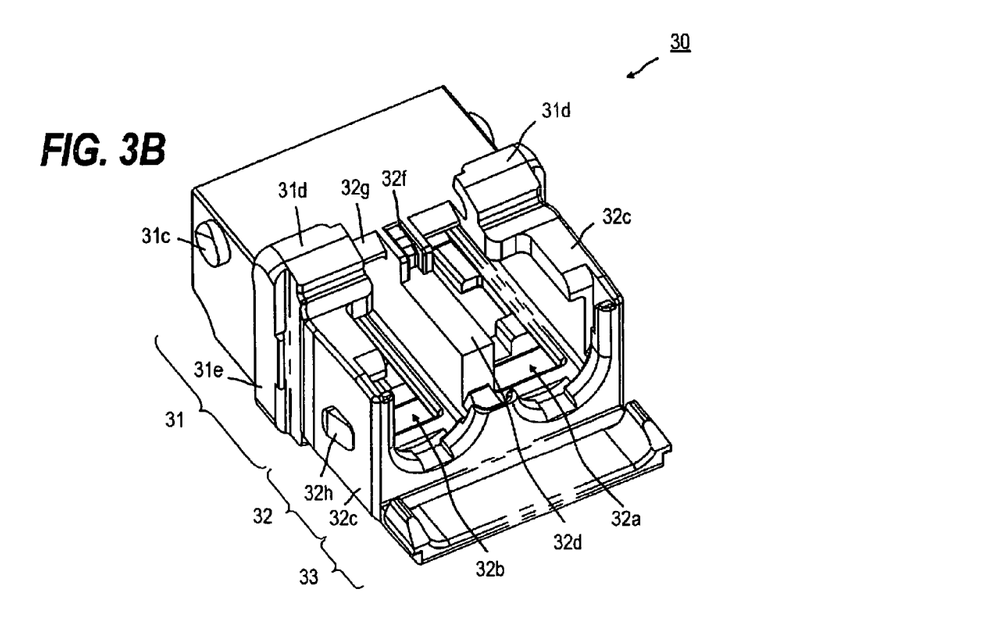

FIG. 3A is a perspective drawing of the receptacle 30 viewed from the front bottom and FIG. 3B is a perspective drawing viewed from the rear bottom. The receptacle 30 is formed by molding resin, and has a receptacle portion 31, a mounting portion 32, and a connecting portion 33 from the front side. The receptacle portion 31 forms two openings, 31a and 31b, each corresponding to the optical transmission and reception, into which the optical connector is to be inserted. The inner dimensions, the width and the depth, are determined by the specification of the optical connector.

On the outer side thereof is formed with a cylindrical projection 31c that becomes the rotational center of the bail 10. On the bottom thereof is formed with the recess 31d, the inner shape of which traces the outer shape of the axial cylinder 22a of the actuator 20. The rear end of the receptacle portion 31 forms a step 31e, the side of the bail 10 abuts against this step 31e to stop the rotation of the bail 10. This step 31e provides a function of the stopper for the bail 10.

The mounting portion 32 mounts a transmitting optical sub-assembly, TOSA, and a receiving optical subassembly, ROSA, thereon. The mounting portion 32 has two spaces, 32a and 32b, within which the TOSA and ROSA are to be installed. The spaces, 32a and 32b, are partitioned by the side wall 32c and the center portion 32d, and forms a plurality of grooves and projections to mount the TOSA and the ROSA. The center partition 32d forms the pocket 32f in the front end thereof.

The projection 24a formed in the end of the elastic bar 24 is set within this pocket 32f. The inner shape of the pocket 34f has a depth gradually shallower to the front, which corresponds to the outer shape, in other words, the cross section of the projection 24a, to be led in smooth to the bottom of the receptacle portion 31. Further, the bottom of the receptacle in both front sides of the center partition forms a slant surface 32g to widen the seesaw motion of the actuator 20 around the axial cylinder 22a. On the outer side wall 32c is formed with the projection 32h to mate with the opening of the cover to facilitate the assembly of the cover 40 with the receptacle portion 31.

The connecting portion 33 is provided for the assembly of the ground finger 70 with the receptacle 30. The ground finger 70, as shown in FIG. 1, extrudes from the gap between the receptacle 30 and the cover 40 even after the cover 40 is set to the receptacle 30. Thus, when the transceiver 1 is inserted into the cage, the ground finger 70 comes in directly contact to the inside of the cage to secure the ground potential of the transceiver 1.

While, the ground finger 70 comes in directly contact to the outside of the TOSA and the ROSA, consequently, the outside of the TOSA and the ROSA is directly in contact to the case ground. The ground finger 70 makes the ground potential of the TOSA and the ROSA stable and enhances the EMI shielding function.

Bail According to the First Embodiment

Figure 4A:
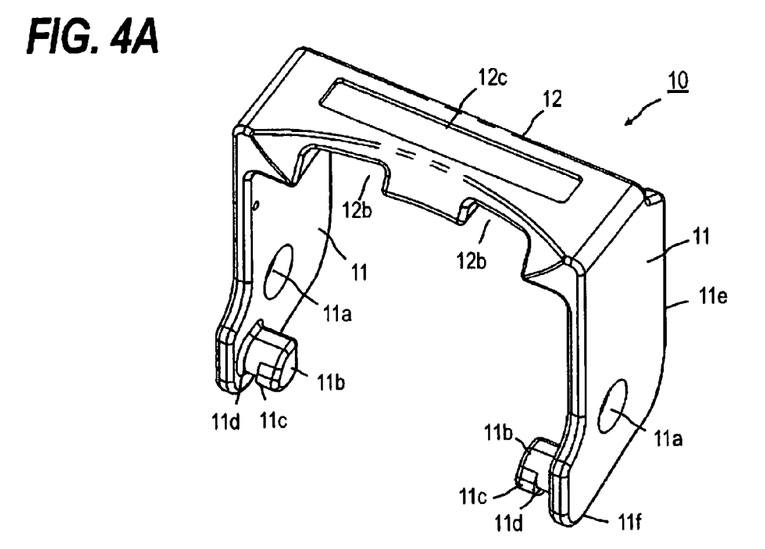
FIGS. 4A and 4B are perspective drawings, viewed from opposite directions, of the bail according to the first type of the present invention.
Figure 4B:
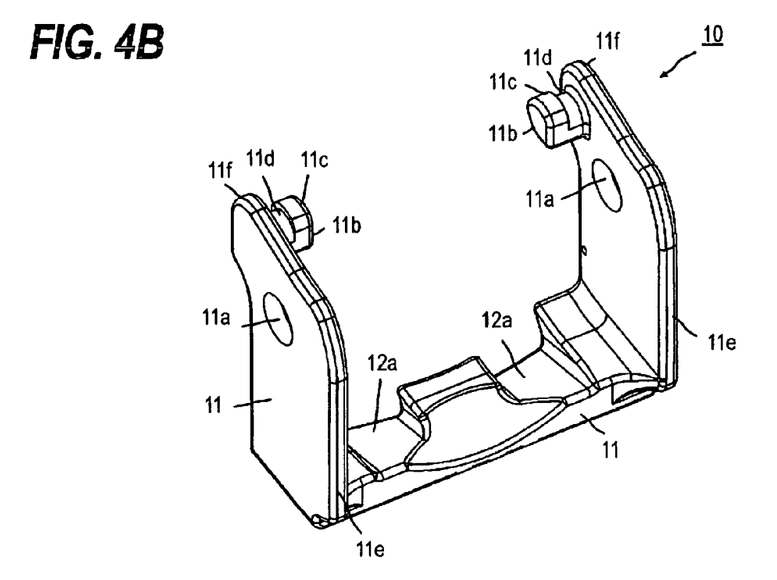

FIG. 4A is a perspective drawing of the bail 10 with the first embodiment viewed from top, while FIG. 4B is a perspective drawing thereof viewed from the bottom. The bail 10 has the so-called U-shaped configuration that comprises a pair of legs 11 and a bridge 12 connecting these legs 11. The bail 10 according to the first embodiment is made of resin. The bridge 12 forms two hollows, 12a and 12b, that continue two openings, 31a and 31b, each for the transmission and the reception of the receptacle 30 when the bail 10 is set in its predetermined position in the receptacle 30. On the top of the bridge 12 is formed with another hollow 12c to put a label therein.

Each leg 11 forms a hole 11a, which becomes the center for rotating the bail 10, and a sliding projection 11b in the inner end thereof. The former hole 11a mates with the projection 31c formed in the outside of the receptacle 30. The sliding projection 11b has a complex shape comprising an edge 11c and a groove 11d. The edge 11c slides within the sliding groove 21b, while the groove 11d receives the guide edge 21e of the actuator 20.

This complex structure combined the frame 11c with the groove 11d and that of the sliding groove 21b with the guide edge 21e of the actuator 20 securely assembles the bail 10 with the actuator 20. Even if the bail 10 rotates, the legs 11 may be prevented from extending outward, thereby preventing the bail from disassembling with the actuator 20.

The rear end 11e of the leg 11 forms in linear to abut against the step 31e of the receptacle 30 at the initial position thereof. Here, the initial position corresponds to a position where the bridge 12 of the bail 10 is in the topmost. On the other hand, the end 11f of the leg 11 abuts against the step 31e when the bail 10 is fully rotated to restrict the bail 10 from further rotating.

Bail According to the Second Embodiment

Figure 5A:
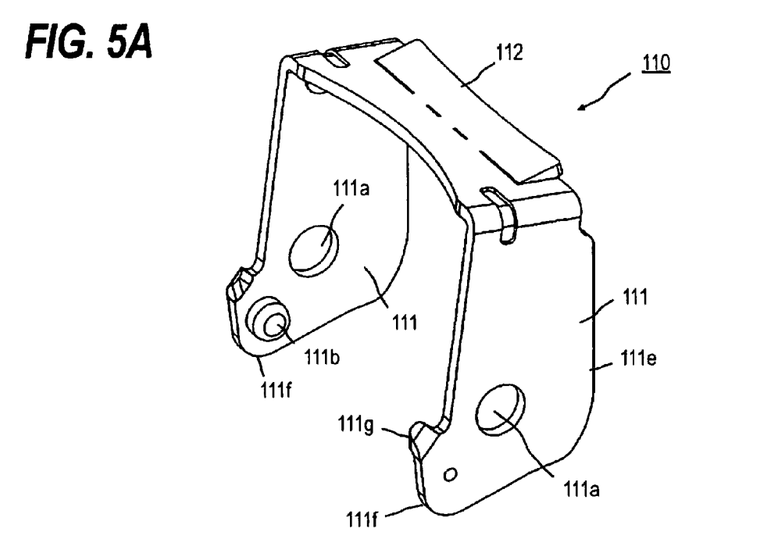
FIGS. 5A and 5B are perspective drawings, viewed from opposite directions, of the bail according to the second type of the present invention.
Figure 5B:
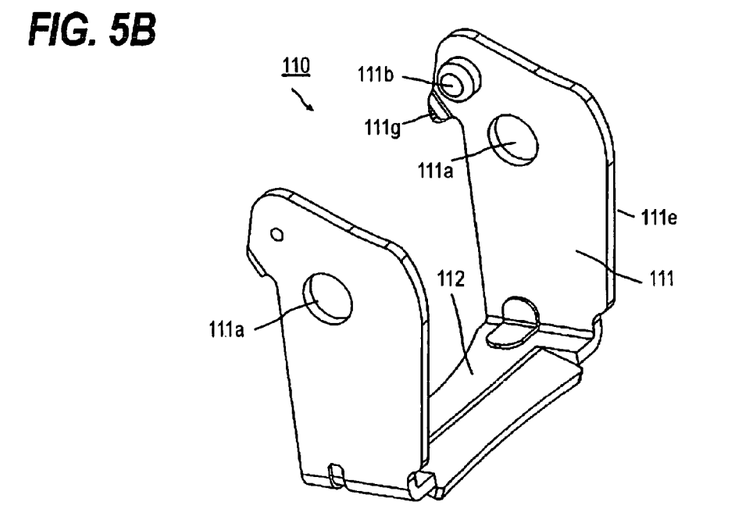

FIG. 5A is a perspective drawing viewed from the top of the bail 110 according to the second embodiment of the invention and FIG. 5B is a perspective drawing thereof viewed from the bottom. The bail 110 of the second embodiment is made of metal plate, such as stainless steel, by cutting and bending. Similar to the bail 10 of the first embodiment, the bail 110 has a pair of legs 111 and a bridge 112 connecting legs 111, which configures the so-called U-shape. The leg 110 has a hole 111a that receives the projection 31c of the receptacle 30 and operates as the rotation center of the bail 110.

The sliding projection 111b is formed inside of the bail at the end thereof, which slides, in a side surface thereof, on the guide edge 21e of the actuator 20. The bail 110 according to the present embodiment does not have the mechanism that slides within the sliding groove 21b of the actuator. The end of the leg 111 forms a bent portion 111g in the end thereof, which facilitates to rotate the bail 10 by pressing it downward. The bent portion 11g is not always to be provided in both legs 111.

When the transceiver 1 is inserted within the cage densely mounted on the host system and the bent portions are provided in both legs 111, it may occur to handle the other bent portion of the adjoining transceiver. By forming the bent portion in only one of legs 111, this subject may be solved.

The rear end 111e of the leg 111 abuts against the step 31e of the receptacle 30 at the initial position, and the tip end 111f thereof abuts thereto at the full rotation of the bail 111, which is the same mechanism as the first embodiment.

Rotation of the Bail and the Seesaw Motion of the Actuator

Figure 6A:
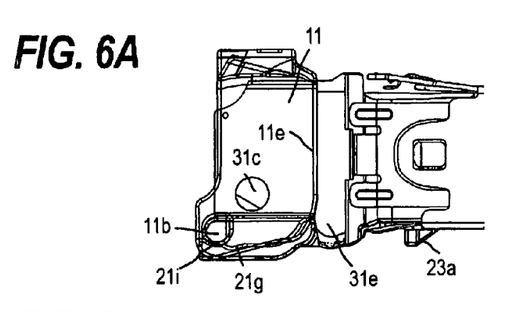
FIGS. 6A to 6E illustrate the seesaw motion of the actuator and the vertical motion of the latching projection connected with the rotational motion of the bail.

FIGS from 6A to 6E explain a relation between the rotation of the bail 10 and the seesaw motion of the actuator 20. FIG. 6A shows the initial position of the bail 10. That is, the bridge 12 of the bail 10 is in the topmost of the receptacle 30 to expose two openings, 31a and 31b. In this position, the sliding projection 11b of the bail 10 is in the end of the sliding surface of the actuator 20, namely, in the first hollow 21i. The latching projection 23a is in the most extruded position to mate with the opening of the cage.

Figure 6B:
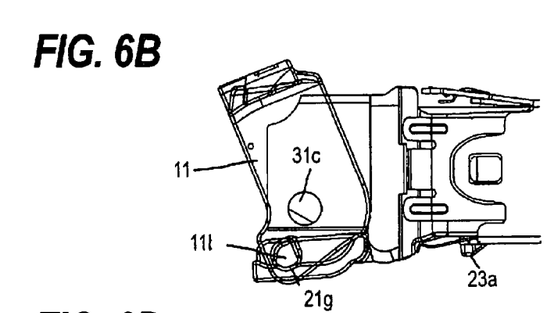

Rotating the bail 10 from the initial position, the sliding projection 11b is set within the second hollow 21g of the actuator at the position shown in FIG. 6B. By preparing this temporal stopping position, the so-called double decker function can be realized. In the temporal stopping position, 21g, although the latching projection 23a is pulled toward the receptacle 30 closer to the position shown in FIG. 6B, an enough amount of the projection is secured.

Figure 6C:
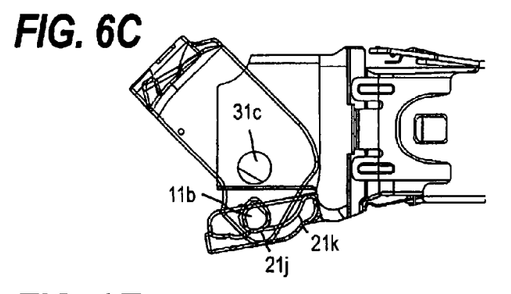
Figure 6D:
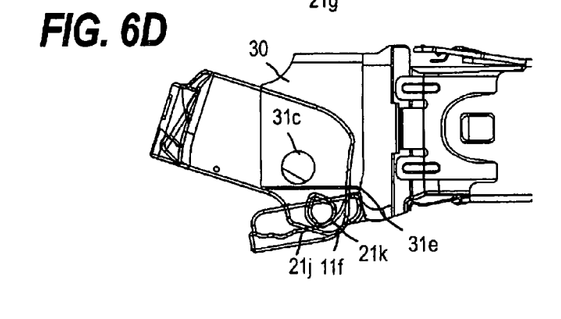

Further rotating the bail 10, the sliding projection 11b slides on the flat surface 21j of the sliding surface as shown in FIG. 6C. A distance from the point where the sliding projection 11b in contact to the flat surface 21j to the center 31c of the rotation gradually lengthens as the bail rotates. Therefore, the sliding projection 11b pushes the actuator 20 outward. Thus, the latching projection 23a is pulled closer to the receptacle 30 by the seesaw motion, and finally, as shown in FIG. 6D, the mating between the latching projection 23b and the latching tab of the cage is released.

Figure 6E:
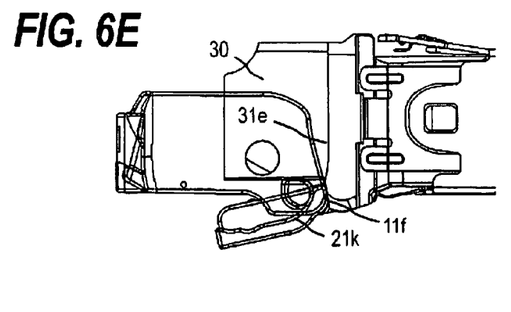

Even further rotating the bail 10, the sliding projection 11b merely slides on the arched surface 21k of the actuator 20, which is formed in substantially equidistant to the center of the rotation, so the actuator 20 does not further cause the seesaw motion. Finally, as shown in FIG. 6E, the end 11f of the leg 11 abuts against the step 31e of the actuator 30, so the bail 11 may be prohibited from further rotation.

Since the cage is made of metal, the individual sizes thereof are scattered in the strict sense. Moreover, even the cage is initially formed in accordance with the standard, to iterate the transceiver inserting into and extracting from the cage causes the deformation of the cage. Therefore, it is unable to decide in precise where the latching projection is released from the latching tab on the sliding surface. However, the sliding projection is in the rear end of the linear potion 21$j$, that is, in the position connecting the flat surface 21$j$ to the arched surface 21$k$, the latching projection 23$a$ is necessary to be pulled inward enough to the receptacle 30.

Further, even the operating portion 23 of the actuator 20 makes a series of motions as the rotation of the bail 10, the elastic bar 24 of the actuator 20 is rigidly fixed to the receptacle 30. Therefore, the repulsive force by the elastic bar 24 to recover the bail 10 from the position shown in FIG. 6E to the initial position shown in FIG. 6A becomes lighter than the force to rotate the bail 10 from the initial position in FIG. 6A to the position shown in FIG. 6E. In particular, when the sliding projection 11$b$ is in the arched surface 21$k$, the bail 10 automatically recovers the position shown in FIG. 6D by the repulsive force of the elastic bar 24.

Moreover, the actuator 20 does not provide a structure to prevent the front end 21$c$ thereof from being pressed downward. Although the elastic bar 24 always presses the body of the actuator 20 against the receptacle 30, to manipulate the front end 21$c$ of the actuator 20 downward may cause the actuator 20 to move in the seesaw motion. This mechanism may be quite effective in the following situation, that is, when a plurality of cages is densely installed on the host system and cages peripheral to the target one mate with the optical connectors with the optical cable, these connectors and cables may disturb the bail of the target transceiver from being manipulated. When the target transceiver is released from the cage, the bail 10 is set in the initial position above the receptacle 30 shown in FIG. 6A, and another cage with a transceiver is installed just above the target cage, the bail 10 of the target transceiver can not manipulated.

Even in such occasion, the front of the receptacle of the target transceiver is widely opened because the optical connector is disengaged with and the front end 21$c$ of the actuator 20 provides an enough space. To push the front end of the actuator 21$c$ downward causes the seesaw motion of the actuator 20 to pull the latching projection 23$a$ in the rear end thereof inward, thereby releasing the transceiver from the cage.

Assembly of the Receptacle with the Bail and the Actuator

Next, the assembly of the actuator 20 with the receptacle 30 will be described as referring to figures from FIGS. 7A to 7D.

Figure 7A:
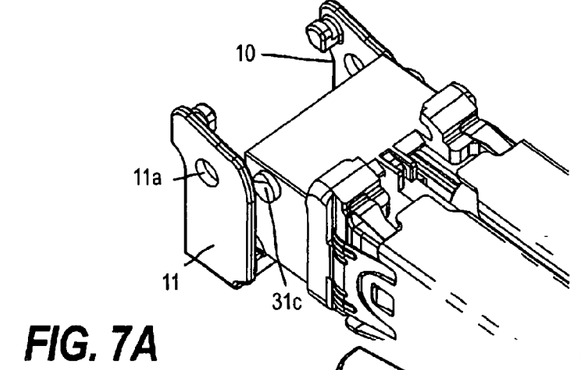
FIGS. 7A to 7D illustrate processes for assembling the bail and the actuator with the receptacle.
Figure 7B:
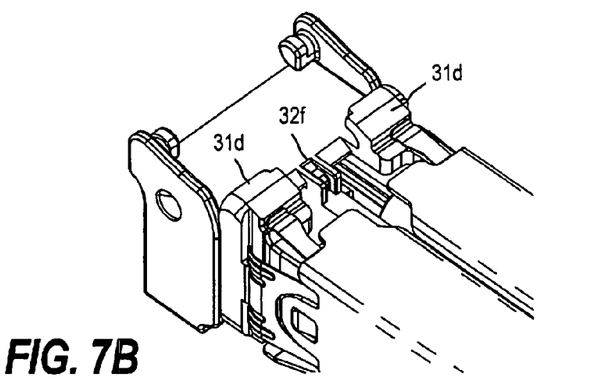
Figure 7C:
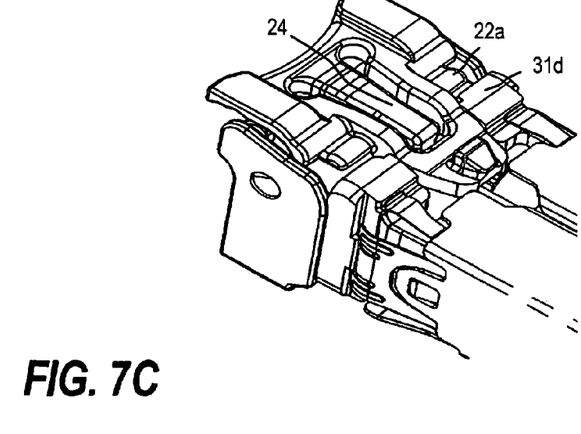
Figure 7D:
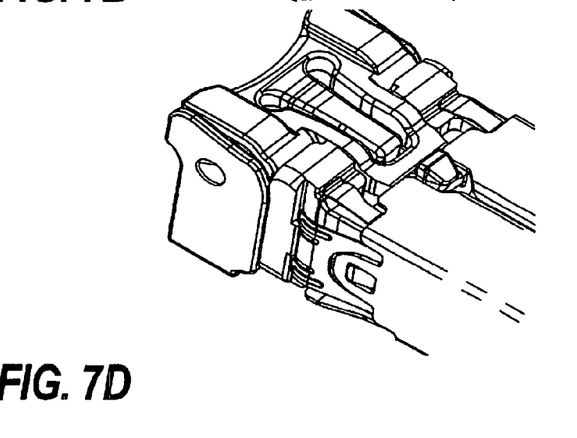

First, the body of the transceiver, which builds with the TOSA and the ROSA, the frame 60, and the cover 40, is assembled with the bail 10, as shown in FIGS. 7A and 7B. Since the legs 11 of the bail 10 may expand to each other by the elasticity inherently attributed to the bridge portion 12, the projection 31$c$ of the receptacle 30 may easily mate with the center hole 11$a$ as widening legs 11, as shown in FIG. 7B.

Next, the actuator 20 is set by the axial cylinder 22 thereof within the recess 31$d$ by sliding the actuator 20 on the bottom of the receptacle 30 from the front thereof. In the same time, the projection 24$a$ in the top of the elastic bar 24 of the actuator 20 is set within the pocket 32$f$ in the center partition of the receptacle 30.

Thus, the actuator 20 can not slide in horizontal, nearly parallel to the bottom of the transceiver, because the recess 31$d$ prevent the actuator 20 from moving rearward while the mating between the projection 24$a$ with the pocket 32$f$ prevent the frontward motion of the actuator 20. Further, for the vertical motion of the actuator 20, in addition that the recess 31$d$ covers the rotational axis 22$a$, the elastic bar 24 always pushes the body of the actuator 20 upward by the elastic force thereof. Therefore, the motion of the actuator 20 in up-and-down direction may be also prevented. Only the seesaw motion around the axis 22 may be allowed.

Thus, the bail 10 and the actuator 20 are assembled with the receptacle 30. As explained referring to FIGS. from 6A to 6E, the engagement with the latching projection 23$a$ formed in the rear end of the actuator 20 may be released from the cage by the vertical motion originated to the rotation of the bail 10.

While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A pluggable optical transceiver used by installing into a cage of a host system, comprising;
    a bail adapted with the optical receptacle, the bail having a pair of leg portions and a bridge portion connecting the leg portions, the leg portion providing a sliding projection in a end thereof and a first axial mechanism to rotate the bail;
    an optical receptacle providing a second axial mechanism in both sides thereof to form a rotational center of the bail by co-operating with the first axial mechanism of the bail, the leg portions of the bail putting the optical receptacle therebetween; and
    an actuator assembled with the receptacle and including an operating portion, an axial portion, and a body portion, the operating and body portions sandwiching the axial portion such that the actuator makes a seesaw motion with the axial portion as a rotational center, the operating portion forming a projection to be latched with the cage, the body portion including a side block,
    wherein the projection of the bail slides on the side block of the actuator to make the seesaw motion of the actuator to release the latching projection in the operating portion of the actuator from the cage.

2. The optical transceiver according to claim 1,
    wherein the side block of the actuator includes a first hollow, a flat surface, and a arched surface in this order, and
    wherein the body portion of the actuator positions in the farthest from the first axial mechanism of the bail when the sliding projection of the bail comes in contact to a point connecting the flat surface to the arched surface of the actuator.

3. The optical transceiver according to claim 2,
    wherein the side block further includes another hollow between the first hollow and the flat surface, the bail being suspended the rotational motion by setting the projection of the leg portion into the other hollow.

4. The optical transceiver according to claim 1,
    wherein the sliding projection of the bail includes a groove and an edge, and the side block of the actuator includes a sliding groove and a guide edge, the groove of the bail receiving the guide edge of the actuator and the edge of the bail being received in the sliding groove of the actuator.

5. The optical transceiver according to claim 4, wherein the bail is made of resin.

6. The optical transceiver according to claim 1, wherein the body portion of the actuator further includes an elastic bar extending to the operating portion and isolated therefrom, the elastic bar making an elevated angle with respect to the body portion.

7. The optical transceiver according to claim 6, wherein the elevated angle is about 3.5°.

8. The optical transceiver according to claim 6, wherein the elastic bar presses the body portion toward the receptacle such that a force to recover the bail to an initial position becomes lighter than a force to rotate the bail from the initial position.

9. The optical transceiver according to claim 6, wherein the receptacle further comprising a center partition with a pocket and a recess, and the elastic bar and the axial portion of the actuator have a projection and an axial cylinder, respectively, the pocket receiving the projection of the elastic bar and the recess receiving the axial cylinder.

10. The optical transceiver according to claim 1, wherein the first axial mechanism is a projection and the second axial mechanism is an opening mated with the projection.

11. The optical transceiver according to claim 1, wherein the first axial mechanism is an opening and the second axial mechanism is a projection mated with the opening.

12. An optical transceiver for transmitting and receiving optical signal by mating with an optical connector, comprising:
a transmitting optical subassembly;
a receiving optical subassembly;
an optical receptacle including a receptacle portion, a mounting portion, and a connecting portion, the receptacle portion providing a pair of openings into which the optical connector is inserted, the mounting portion mounting the transmitting optical subassembly and the receiving optical subassembly;
a bail assembled with the optical receptacle, the bail being configured to an U-shape with a pair of leg portions and a bridge portion connecting the leg portions, the leg portions putting the receptacle therebetween so as to expose the openings of the receptacle portion, the leg portion forming a sliding projection in a end thereof;
an actuator assembled with the optical receptacle, the actuator including a body portion, an operating portion and an axial portion, the body portion providing a side block where the sliding projection of the bail slides thereon to make a seesaw motion in the body portion and the operating portion with the axial portion as a rotational center.

13. The optical transceiver according to claim 12, wherein the side block of the actuator provides a first hollow, a flat surface, and an arched surface, and
wherein the body portion of the actuator positions in the farthest from the receptacle when the sliding projection of the bail comes in contact to a point connecting the flat surface to the arched surface of side block of the actuator.

14. The optical transceiver according to claim 12, wherein the sliding projection of the bail includes a groove and an edge, and the side block of the actuator includes a sliding groove and a guide edge, the groove of the bail receiving the guide edge of the actuator and the edge of the bail being received in the sliding groove of the actuator.

15. The optical transceiver according to claim 12, wherein the body portion of the actuator further includes an elastic bar extending to the operating portion and isolated therefrom, the elastic bar making an elevated angle with respect to the body portion.

16. The optical transceiver according to claim 15, wherein the elastic bar presses the body portion toward the receptacle such that a force to recover the bail to an initial position becomes lighter than a force to rotate the bail from the initial position.

* * * * *